(12) United States Patent
Chee

(10) Patent No.: US 6,490,072 B2
(45) Date of Patent: Dec. 3, 2002

(54) MIRROR ANGLE ADJUSTMENT AND MOUNTING SYSTEM FOR A LASER SCANNER DEVICE

(75) Inventor: Christopher Gregory Chee, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 14 days.

(21) Appl. No.: 09/759,140

(22) Filed: Jan. 12, 2001

(65) Prior Publication Data

US 2002/0093715 A1 Jul. 18, 2002

(51) Int. Cl.[7] .............................................. G02B 26/08
(52) U.S. Cl. ....................... 359/198; 359/212; 359/223; 359/226; 359/872
(58) Field of Search ................................ 359/196–226, 359/872; 347/242, 243, 257–261

(56) References Cited

U.S. PATENT DOCUMENTS

| | | |
|---|---|---|
| 4,171,902 A | 10/1979 | Imai et al. |
| 4,277,154 A | 7/1981 | Sakabinos |
| 4,305,646 A | 12/1981 | Bechtold |
| 4,403,235 A | 9/1983 | Fedder et al. |
| 4,704,638 A | 11/1987 | Igarashi |
| 4,762,994 A | 8/1988 | Byerly et al. |
| 5,001,499 A | 3/1991 | Waragai et al. |
| 5,019,837 A | 5/1991 | Schwarz |
| 5,151,810 A | 9/1992 | Blanding et al. |
| 5,214,441 A | 5/1993 | Blanding et al. |
| 5,237,348 A | 8/1993 | Blanding et al. |
| 5,294,943 A | 3/1994 | Blanding et al. |
| 5,301,060 A | 4/1994 | Niikawa et al. |
| 5,374,993 A | 12/1994 | Diehl et al. |
| 5,376,994 A | 12/1994 | Mama et al. |
| 5,390,051 A | 2/1995 | Saito et al. |
| 5,475,522 A | 12/1995 | Itabashi et al. |
| 5,504,613 A | 4/1996 | Itabashi et al. |
| 5,506,719 A | 4/1996 | Murakami et al. |
| 5,543,829 A | 8/1996 | Fisli |
| 5,592,337 A | 1/1997 | Hama |
| 5,617,133 A | 4/1997 | Fisli |
| 5,621,562 A | 4/1997 | Hama |
| 5,638,189 A | 6/1997 | Yanagisawa |
| 5,712,719 A | 1/1998 | Hama |
| 5,715,078 A | 2/1998 | Shiraishi |
| 5,793,408 A | 8/1998 | Nakajima |
| 5,801,746 A | 9/1998 | Yamaguchi et al. |
| 5,850,306 A | 12/1998 | Fukotome et al. |
| 5,946,023 A | 8/1999 | Blanding |
| 5,963,240 A | 10/1999 | Shinohara et al. |
| 5,970,597 A | 10/1999 | Bedzyk et al. |

Primary Examiner—James Phan
(74) Attorney, Agent, or Firm—Ronald K. Aust

(57) ABSTRACT

An electrophotographic machine mirror assembly includes a mirror having two opposite ends and a reflective surface. A laser device scans a laser beam along the reflective surface to define a fold line thereon. The fold line extends substantially between the two opposite ends of the mirror. At least one fixed mounting device has a support surface. At least one rotational device is attached to the mirror. The at least one rotational device has an arcuate surface defining an imaginary circle and engaging the support surface of the at least one fixed mounting device. The imaginary circle has a center substantially coincident with the fold line of the reflective surface. The at least one rotational device rotates about the center of the imaginary circle to thereby rotate the mirror about the fold line.

11 Claims, 6 Drawing Sheets

MIRROR ANGLE ADJUSTMENT AND MOUNTING SYSTEM FOR A LASER SCANNER DEVICE

BACKGROUND OF THE INVENTION

1. Field of the Invention

The present invention relates to a mirror for a laser scanning device, and, more particularly, to a mechanism for rotating a mirror of a laser scanning device.

2. Description of the Related Art

In a typical compact laser scanner device of the type commonly found in laser printers, a scanned laser beam is directed via optical fold mirrors to be incident upon a photoconductor drum. Such optical fold mirrors are commonly held in place by flat spring clips that provide a force in a direction to bias the optical fold mirror against three support mounts protruding from the laser scanner housing. These protrusions are usually located at the ends of the optical fold mirror in the main scanning direction. Two of these protrusions, one on each end, are usually fixed while the third is adjustable, thus allowing for small adjustments of the optical fold mirror. Common means of obtaining adjustments include screws and cams.

The main difficulty associated with the above-described mounting scheme is ensuring that the mirror rotates about its intended axis of rotation. To preserve the performance of the optical system, it is essential that the mirror rotates about an axis that is co-linear with the line created by the intersection of the scan plane and the plane of the reflecting surface of the fold mirror, hereinafter referred to as the fold line.

This is not achievable in the above-described mirror mounting scheme because the fixed mirror supports must be offset in the cross scan direction by approximately half the width of the mirror in order to provide a stable mirror mount. This inherently creates a rotation axis that is skewed to the fold line. In addition, it is possible for the fold mirror to not rotate about this skewed line at all and, instead, rotate about the hard stops that locate the mirror in the cross scan direction. This occurs when the clamp force in the cross scan direction is sufficiently high, thus developing a frictional force between the mirror and the hard stops that is greater than the force exerted by the bias flat spring.

What is needed in the art is a device for locating and fixing an optical fold mirror to a housing of a laser scanner device to ensure that the mirror rotates about its intended axis.

SUMMARY OF THE INVENTION

The present invention provides a mirror mounting arrangement that allows the optical fold mirror to rotate about an axis co-linear with the fold line and, subsequently, be held in its adjusted position.

The invention comprises, in one form thereof, an electrophotographic machine mirror assembly including a mirror having two opposite ends and a reflective surface. A laser device scans a laser beam along the reflective surface to define a fold line thereon. The fold line extends substantially between the two opposite ends of the mirror. At least one fixed mounting device has a support surface. At least one rotational device is attached to the mirror. The at least one rotational device has an arcuate surface defining an imaginary circle and engaging the support surface of the at least one fixed mounting device. The imaginary circle has a center substantially coincident with the fold line of the reflective surface. The at least one rotational device rotates about the center of the imaginary circle to thereby rotate the mirror about the fold line.

An advantage of the present invention is that the mirror rotates about an axis that is co-linear with the fold line.

Another advantage is that the arcuate surface of the mirror mounts provide smooth and easily controllable movement of the mirror to thereby enable accurate positioning thereof.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
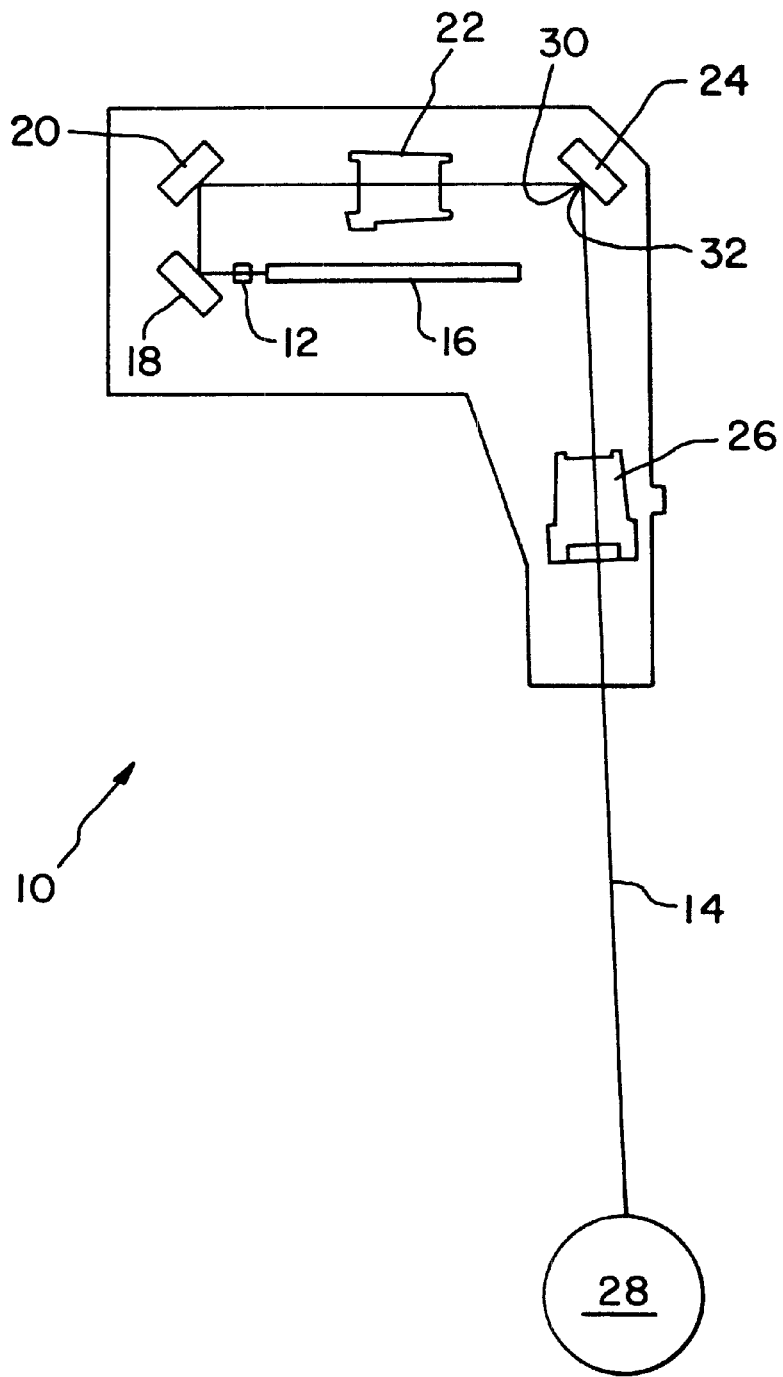
FIG. 1 is a schematic, side view of a laser scanner device.

Referring now to the drawings, and, more particularly, to FIG. 1, there is shown a known laser scanner device 10 including a laser diode 12 emitting a laser beam 14 that is focused onto a polygon scanner 16. The facets of polygon scanner 16 scan beam 14 towards a lower turn mirror 18 which in turn deflects beam 14 towards an upper turn mirror 20. Turn mirror 20 redirects beam 14 through a first F-Theta lens 22 and towards an optical fold mirror 24. Fold mirror 24 redirects laser beam 14 through a second F-Theta lens 26 and towards a photoconductive drum 28.

To maintain the performance of the F-Theta system it is essential that optical fold mirror 24 rotate about a line passing through points 30 and 32. Points 30 and 32 are located towards the end of fold mirror 24 in the main scanning direction and, more importantly, are coincident with the fold line.

Figure 2:
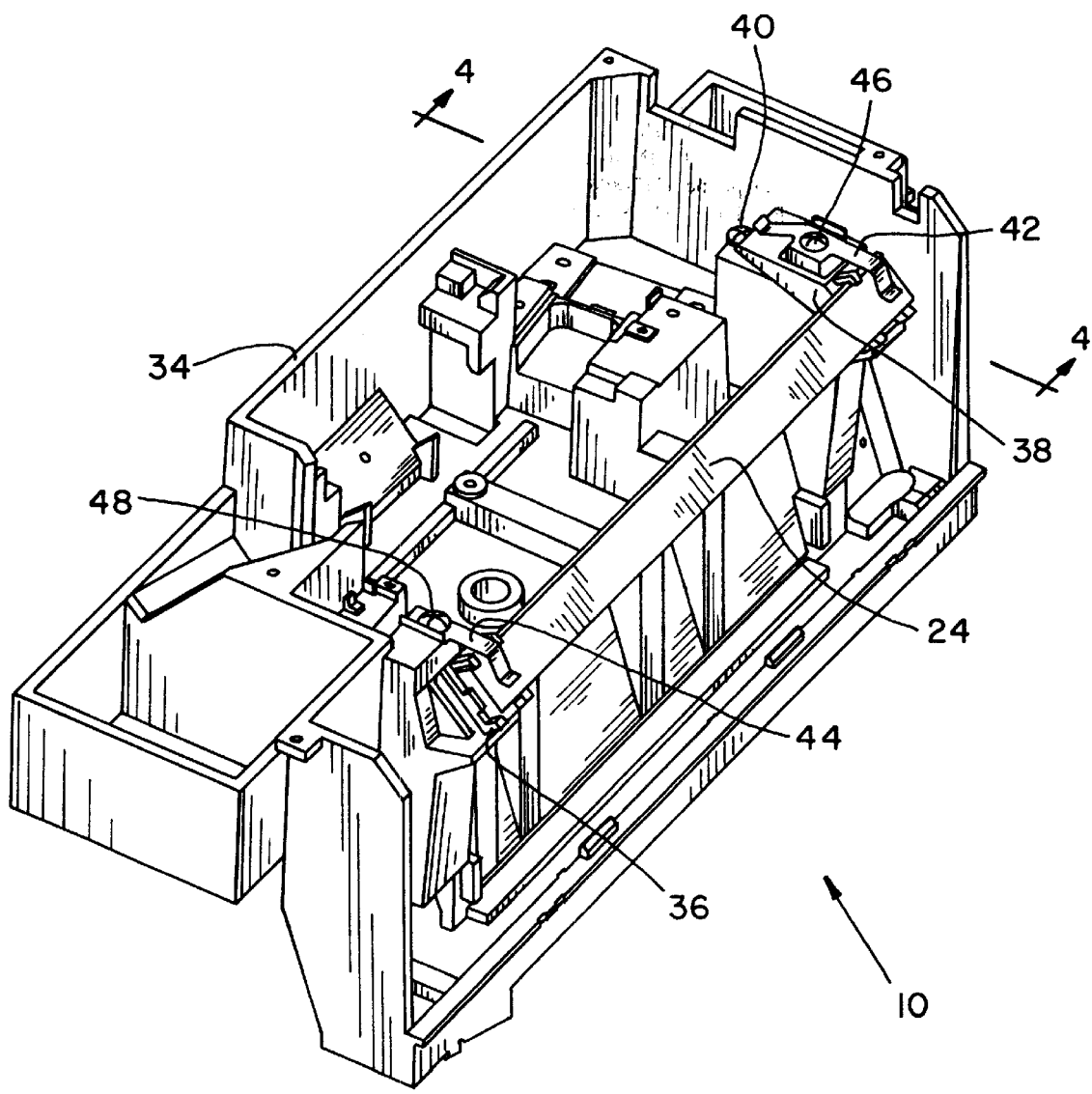
FIG. 2 a perspective view of the laser scanner device of FIG. 1 with one embodiment of a mirror angle adjustment and mounting system of the present invention.
Figure 3:
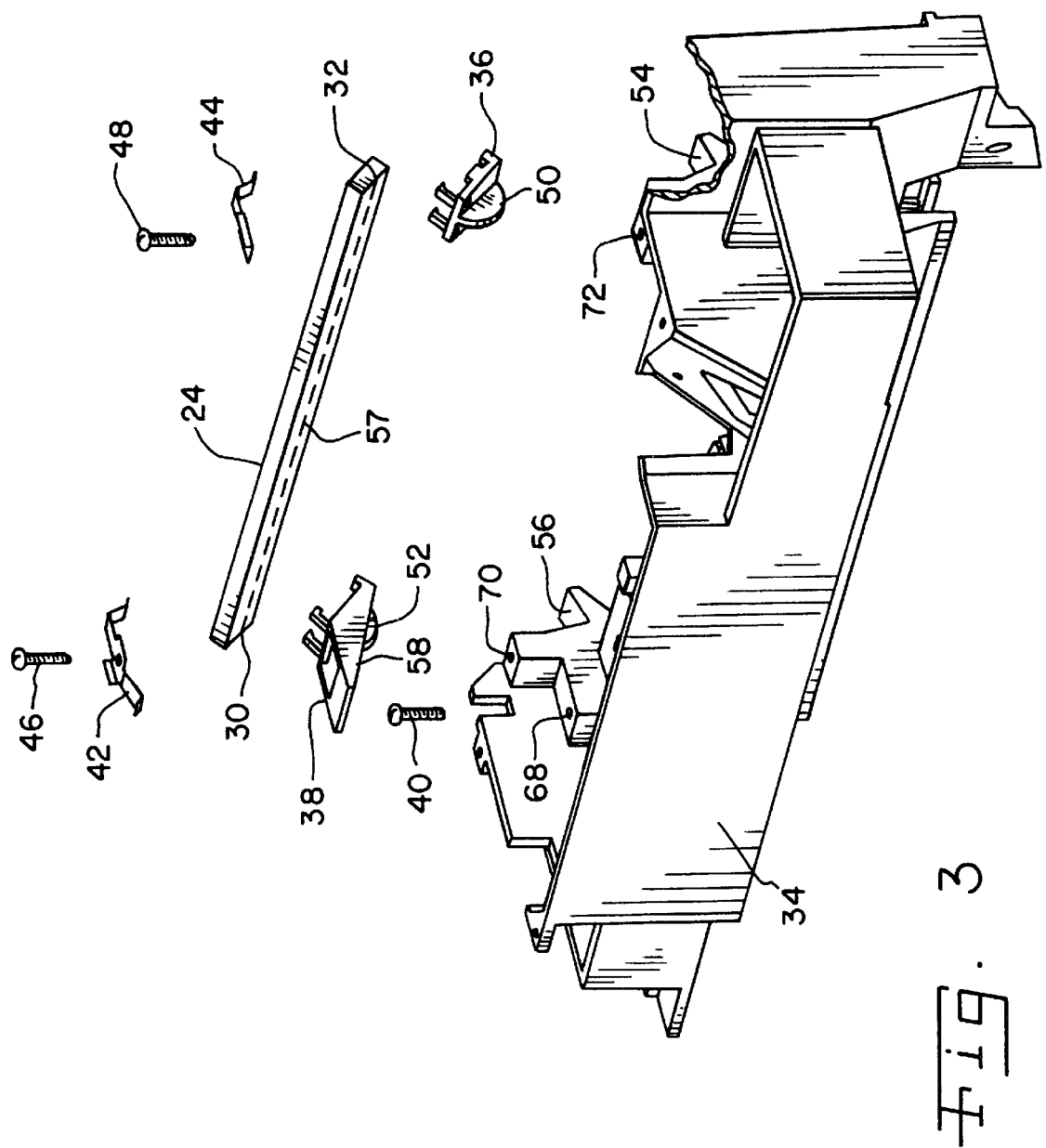
FIG. 3 a exploded, perspective view of the laser scanner device of FIG. 2.

Laser scanner device 10 includes a scanner housing 34 (FIG. 2). Mounting and adjustment hardware associated with fold mirror 24 includes a follower mirror mount 36, adjust mirror mount 38, adjustment screw 40, clip retainers 42, 44, and fixing screws 46, 48. FIG. 3 is an exploded view of the same components.

Mirror mounts 36 and 38 include respective semi-circular arcs 50 and 52 (FIG. 3) that allow fold mirror 24, once mounted to mirror mounts 36, 38, to rotate in V-notches 54 and 56 located in laser scanner housing 34. Semi-circular arcs 50, 52 define respective imaginary circles, the centers of which are co-linear with a fold line 57 joining points 30, 32. V-notches 54 and 56 are sized and positioned to allow the center of rotation of mirror blocks 36, 38 to be coincident with points 30 and 32. Rotating fold mirror 24 about fold line 57 is achieved by referencing its reflecting surface to the mirror mounts at points 30 and 32. Mirror mount 38 includes a pivoting arm 58 which pivots about the fold line extending between points 30, 32.

Figure 4:
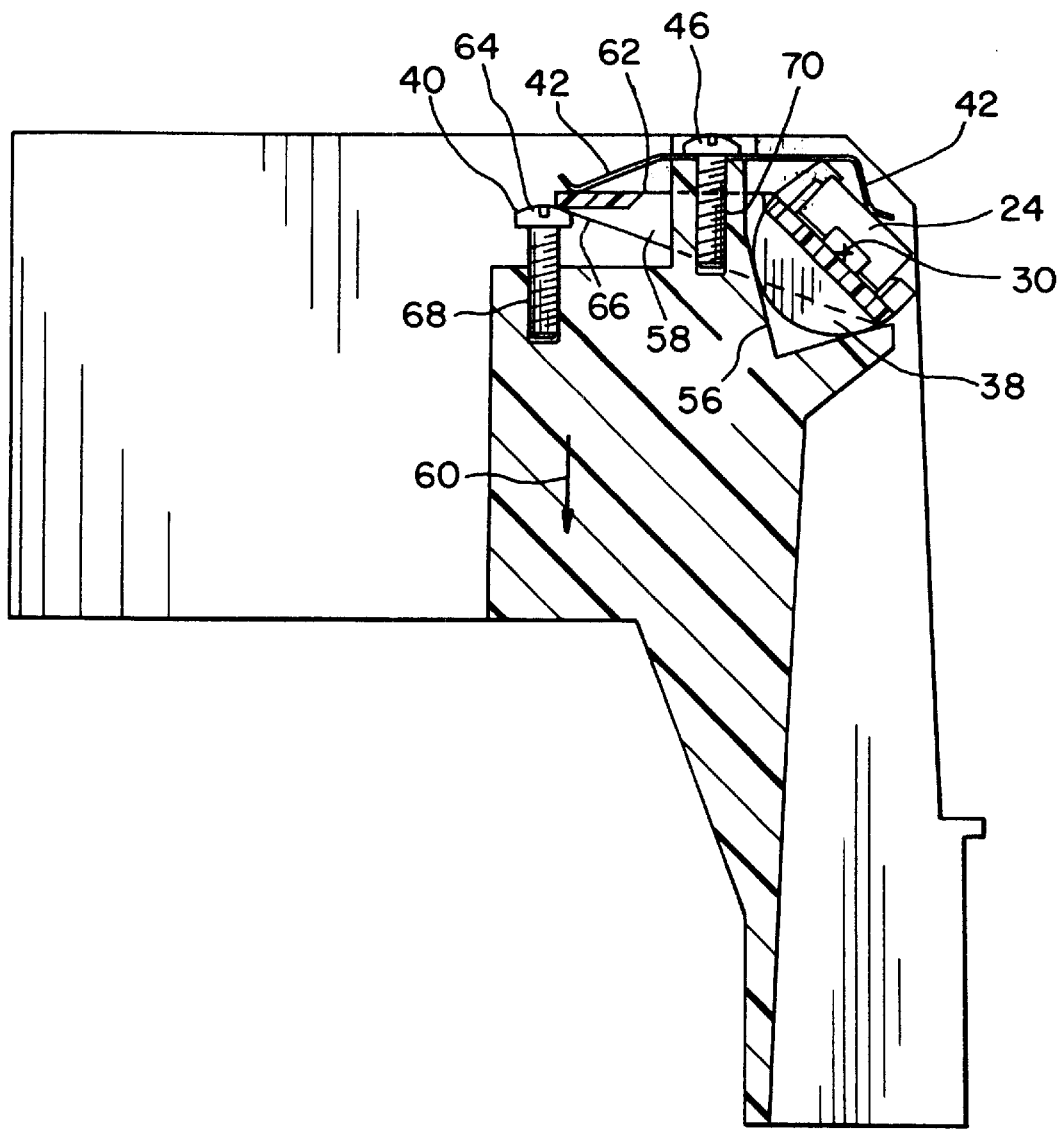
FIG. 4 is a cross-sectional, side view of the laser scanner device along line 4—4 in FIG. 2.

Clip retainer 42 exerts a force in direction 60 (FIG. 4) on an upper side 62 of pivoting arm 58. A top surface 64 of adjustment screw 40 supports a lower side 66 of pivoting arm 58 in equilibrium against the force of clip retainer 42. Adjustment of the fold mirror 24 is achieved by moving adjustment screw 40 in the vertical direction, in or out of screw hole 68, to thereby cause pivoting of pivot arm 58. Sensitivity of the rotational adjustment is obtained by a combination of the screw's pitch and its horizontal distance from the fold line.

As adjust mirror mount 38 causes mirror 24 to rotate about the fold line between points 30, 32, mirror 24 in turn causes follower mirror mount 36 to rotate about the fold line. Clip retainers 42 and 44 hold fold mirror 24 in position by providing bias forces against V-notches 54, 56 and adjustment screw 40. Fixing screws 46, 48 securely and stably hold clip retainers 42 and 44 in place.

Figure 5:
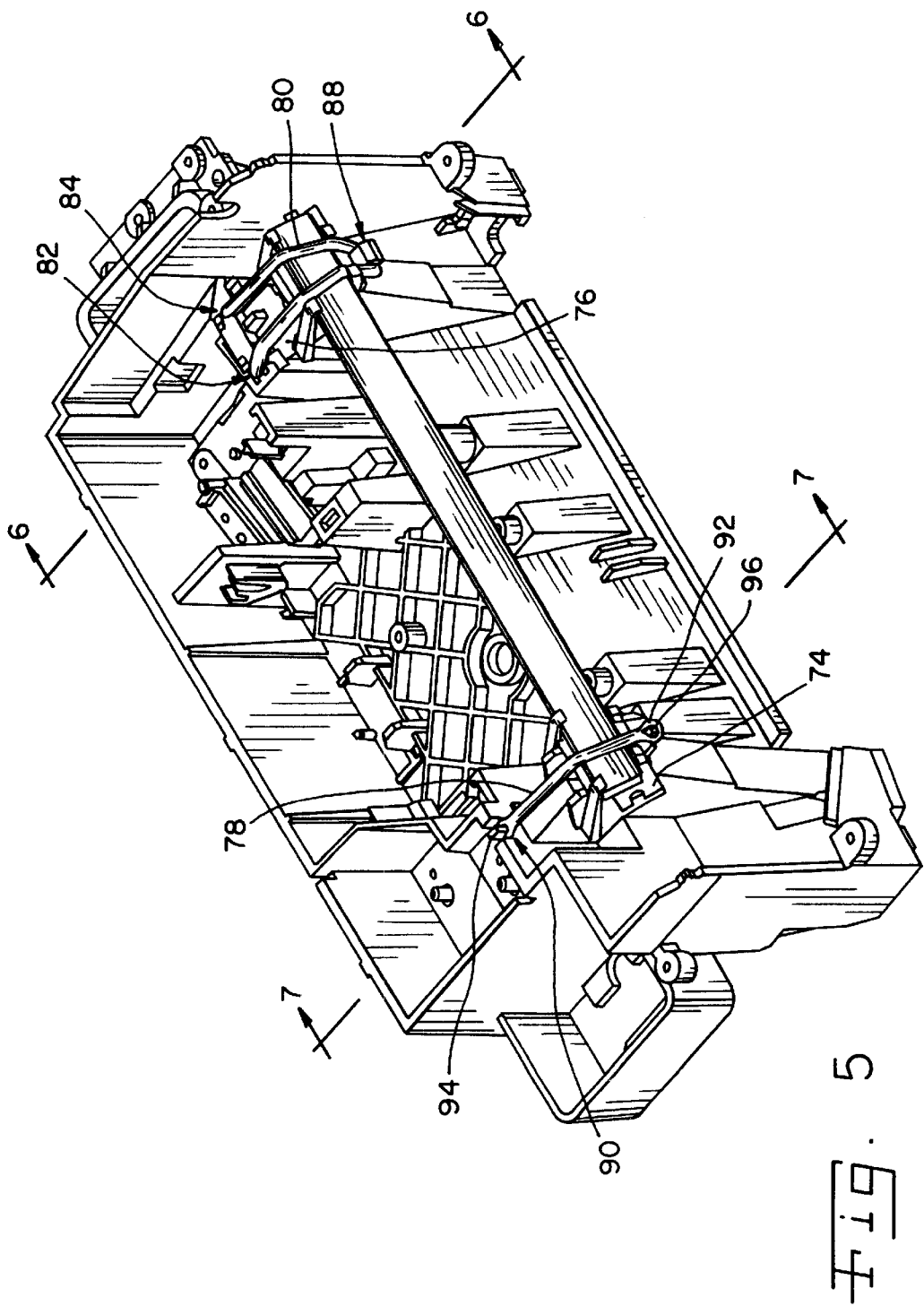
FIG. 5 is a perspective view of a laser scanner device with another embodiment of a mirror angle adjustment and mounting system of the present invention.
Figure 6:
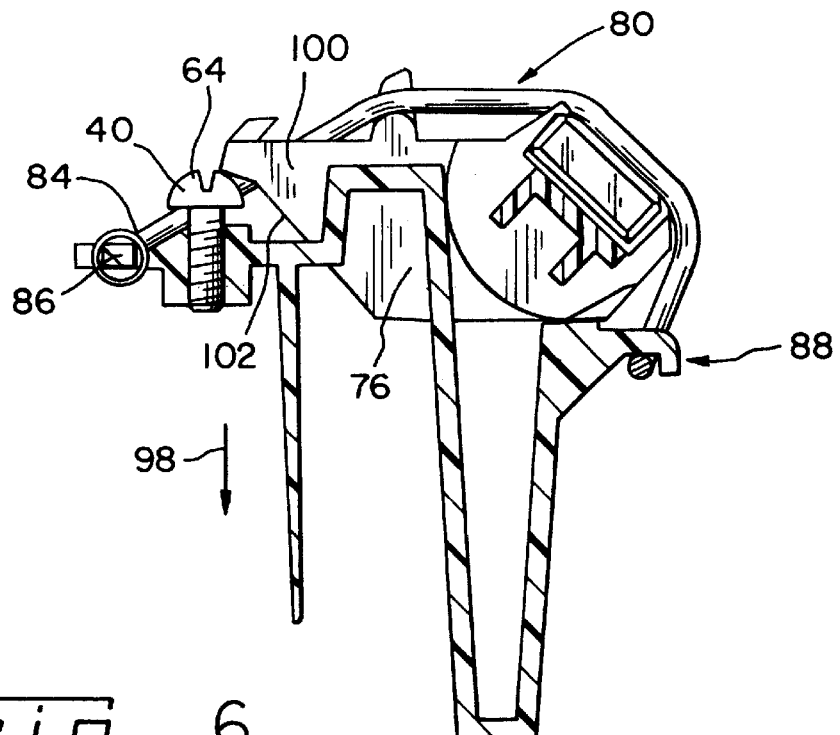
FIG. 6 is a cross-sectional, side view of the laser scanner device along line 6—6 in FIG. 5.
Figure 7:
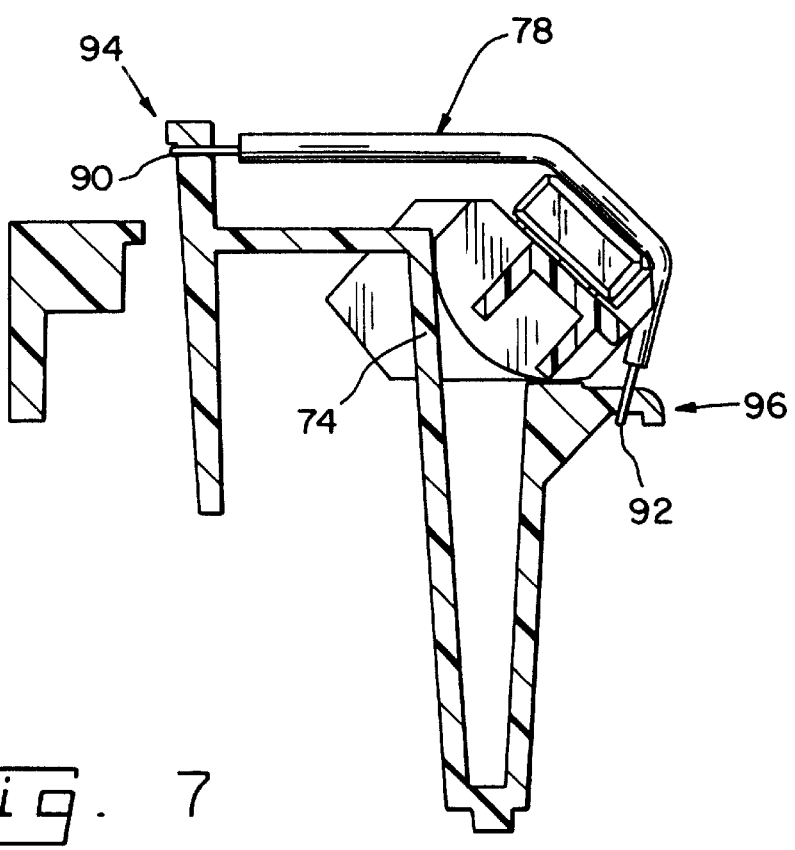
FIG. 7 is a cross-sectional, side view of the laser scanner device along line 7—7 in FIG. 5.

In another embodiment (FIG. 5), mirror mounts 74 and 76 are biased against the V-notches by extension springs 78 and 80, respectively, rather than by clip retainers 42, 44, and fixing screws 46, 48. Ends 82 and 84 of spring 80 hook over projections 86, one of which is shown in FIG. 6. Spring 80 is then stretched and looped under another projection 88. Ends 90 and 92 of spring 78 are hooked over projections 94 and 96, respectively, as best seen in FIG. 7.

Extension spring 80 exerts a force in direction 98 (FIG. 6) on pivoting arm 100. A top surface 64 of adjustment screw 40 supports a lower side 102 of pivoting arm 100 in equilibrium against the force of spring 80.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrophotographic machine mirror assembly, comprising:

a mirror having two opposite ends and a reflective surface;

a laser device configured to scan a laser beam along said reflective surface to define a fold line thereon, said fold line extending substantially between said two opposite ends of said mirror;

at least one fixed mounting device having a support surface; and at least one rotational device attached to said mirror, said at least one rotational device having an arcuate surface defining an imaginary circle and engaging said support surface of said at least one fixed mounting device, said imaginary circle having a center substantially coincident with said fold line of said reflective surface, said at least one rotational device being configured to rotate about said center of said imaginary circle to thereby rotate said mirror about said fold line.

2. The mirror assembly of claim 1, further comprising at least one biasing device configured to bias said at least one rotational device against said at least one fixed mounting device.

3. The mirror assembly of claim 1, wherein said at least one rotational device includes a pivoting arm configured to pivot about said center of said imaginary circle.

4. The mirror assembly of claim 3, further comprising an actuating device configured to pivot said pivoting arm about said center of said imaginary circle.

5. The mirror assembly of claim 4, wherein said actuating device comprises:

a biasing device biasing a first side of said pivoting arm in a first direction; and a screw device supporting a second side of said pivoting arm against a force of said biasing device.

6. The mirror assembly of claim 5, wherein said fixed mounting device includes a screw hole receiving said screw device, said screw device being configured to screw into and out of said screw hole to thereby pivot said pivoting arm about said center of said imaginary circle.

7. The mirror assembly of claim 6, wherein sensitivity of said screw device is dependent upon at least one of a pitch of said screw device and a distance between said screw device and said fold line.

8. The mirror assembly of claim 1, wherein said at least one fixed mounting device comprises a housing of the electrophotographic machine, said housing having at least one V-notch.

9. The mirror assembly of claim 1, wherein said at least one rotational device comprises at least one mirror mount.

10. The mirror assembly of claim 9, wherein said at least one mirror mount comprises at least two mirror mounts, a respective one of said mirror mounts being attached to each of said two opposite ends of said mirror.

11. The mirror assembly of claim 1, wherein said at least one fixed mounting device is positioned such that said center of said imaginary circle is coincident with said fold line.

* * * * *